United States Patent [19]

Ravel

[11] 4,453,223
[45] Jun. 5, 1984

[54] DEVICE FOR COMPUTING THE PSEUDO-VARIANCE OF THE INSTANTANEOUS PERIODS OF AN ALTERNATING-CURRENT SIGNAL

[75] Inventor: Paul Ravel, Paris, France
[73] Assignee: Thomson-CSF, Paris, France
[21] Appl. No.: 328,744
[22] Filed: Dec. 8, 1981
[30] Foreign Application Priority Data Dec. 12, 1980 [FR] France ................. 80 26411

[51] Int. Cl.$^3$ ............................................. G01S 15/00
[52] U.S. Cl. ...................................... 364/517; 364/570; 364/715; 364/554; 367/135
[58] Field of Search .............. 364/517, 569, 724, 554, 364/715; 377/49; 367/135; 343/5 DP

[56] References Cited

U.S. PATENT DOCUMENTS

| | | | |
|---|---|---|---|
| 3,562,649 | 1/1971 | Hoffman | 364/569 |
| 3,714,654 | 1/1973 | Wicks et al. | 343/5 DP |
| 3,723,951 | 2/1973 | Kush et al. | 367/135 |
| 3,925,650 | 12/1975 | Brown | 364/517 |
| 4,165,459 | 8/1979 | Curtice | 364/569 |
| 4,176,337 | 11/1979 | Aechter et al. | 367/135 |

FOREIGN PATENT DOCUMENTS 2349241 11/1977 France .

*Primary Examiner*—David H. Malzahn
*Assistant Examiner*—Thomas Black
*Attorney, Agent, or Firm*—Roland Plottel

[57] ABSTRACT

The device for computing the pseudo-variance $$\sum_{i=1}^{N-1} |(P_{i+1} - P_i)|$$

of the N instantaneous periods $P_i$ of an alternating-current signal $S_e$ and especially for detecting a signal in the presence of noise comprises means for detecting the sign of the difference $P_{i+1} - P_i$, means for adding the quantity $2(P_{i+1} - P_i)$ to the quantity $$P_1 + 2 \sum_{j=1}^{i-1} (P_{j+1} - P_j)$$

(with $1 \leq j \leq i$ and $P_{j+1} - P_j$) when $P_{i+1}$ is greater than $P_i$, and means for subtracting the value $P_N$ from the value $$P_1 + 2 \sum_{i=1}^{N-1} (P_{i+1} - P_i)$$

(with $P_{i+1} > P_i$), the pseudo-variance to be determined being provided by the subtraction means.

10 Claims, 3 Drawing Figures

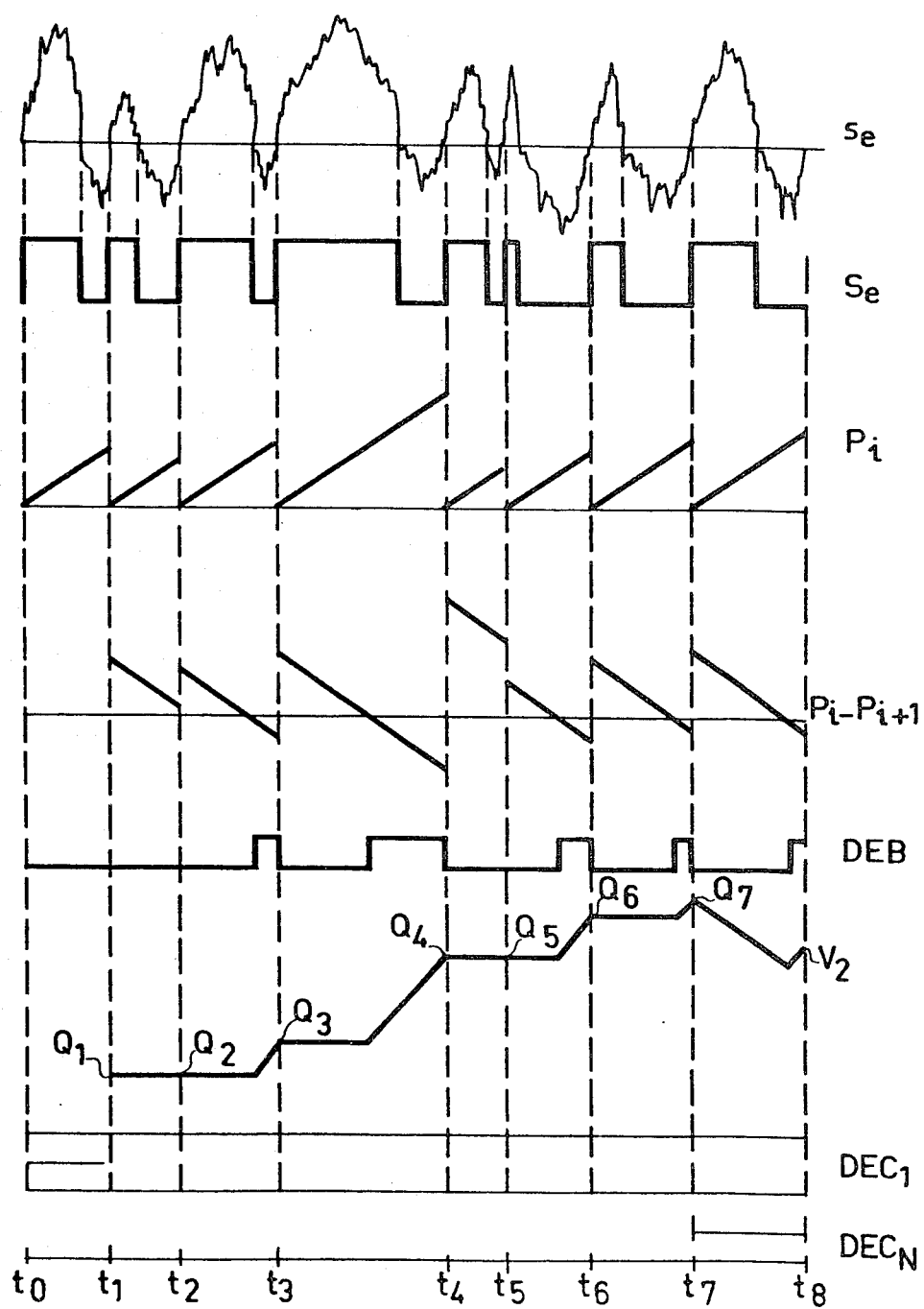

DEVICE FOR COMPUTING THE PSEUDO-VARIANCE OF THE INSTANTANEOUS PERIODS OF AN ALTERNATING-CURRENT SIGNAL

This invention relates to a device for computing the pseudo-variance of the instantaneous periods of an alternating-current signal.

This device is primarily applicable to systems for detecting a signal in the presence of noise. Radar or sonar sets are usually equipped with detection systems of this type.

Measurement of pseudo-variance of the instantaneous periods of an alternating-current signal in fact constitutes a signal detection criterion which is based on the statistical properties of zero-crossings of a signal mixed with noise.

The advantage of a device of this type in radar or sonar systems lies in the fact that the pseudo-variance of a signal constitutes a highly effective means of estimating the nature of the received signal: a pseudo-variance of low value characterizes a pure-frequency signal, a pseudo-variance of high value characterizes a "noise alone" and all the intermediate values characterize the ratio of signal to "noise alone", this latter being assumed to be known as a result of preliminary tests carried out on the mobile carrier unit under various conditions of environment.

The pseudo-variance of the N instantaneous periods $P_i$ (i being a whole number which is variable from 1 to N) between the consecutive zero-crossings of an alternating-current signal is defined by the formula $$\sum_{i=1}^{N-1} |P_{i+1} - P_i|$$

This formula represents the sum of absolute values of the differences between N successive instantaneous periods of the alternating-current signal.

A conventional device for computing pseudo-variance is provided in series with means for clipping the alternating-current signal, a counter associated with a clock for measuring the time-duration of each instantaneous period $P_i$, a subtractor associated with a first buffer storage device for computing the N differences $P_{i+1} - P_i$, an adder associated with a second buffer storage device for adding together the N difference $P_{i+1} - P_i$, and a counter for counting the number N of instantaneous periods in order to initialize the computation process and to validate the result obtained at the output of the second buffer storage device.

This conventional device has a structure which is designed in accordance with the pseudo-variance formula but suffers from a drawback in that a large number of components are required for its construction.

The aim of the present invention is to provide a pseudo-variance computation device which has a simplified structure and which, in particular, does not entail the use of any adder or any buffer storage device.

In accordance with a distinctive feature of the invention, the device for computation of the pseudo-variance $$\sum_{i=1}^{N-1} |P_{i+1} - P_i|$$

of the N instantaneous periods $P_i$ (i being a whole number which is variable from 1 to N−1) of an alternating-current signal is provided in series with clipping means for limiting the amplitude of the alternating-current signal, detection means for detecting the sign of the difference $P_{i+1} - P_i$, selective addition means for adding the quantity $2(P_{i+1} - P_i)$ to the quantity $$P_1 + 2 \sum_{j=1}^{i-1} (P_{j+1} - P_j)$$

(j being a whole number which is variable from 1 to i−1 and $P_{j+1}$ being greater than $P_j$) when $P_{i+1}$ is greater than $P_i$, and subtraction means for subtracting the value $P_N$ from the value $$P_1 + 2 \sum_{i=1}^{N-1} P_{i+1} - P_i$$

(with $P_{i+1}$ greater than $P_i$), the subtraction means being intended to provide the pseudo-variance which it is sought to determine.

Other features of the inention will be more apparent upon consideration of the following description and accompanying drawings, wherein:

FIG. 3 is a diagram of the waveforms obtained at different points of the device shown in FIGS. 1 and 2.

Figure 1:
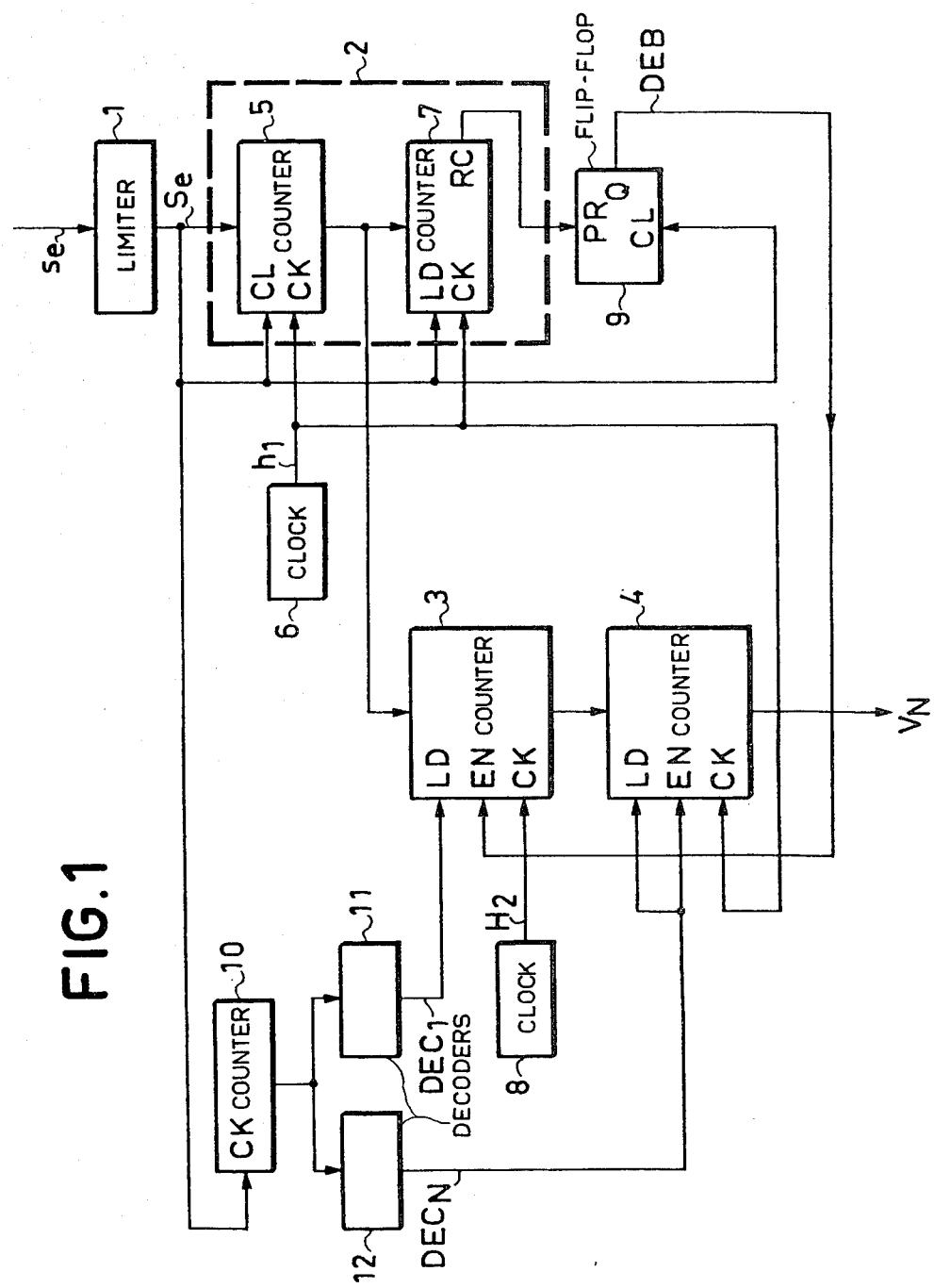
FIG. 1 is a diagram of a pseudo-variance computation device showing a first embodiment of the selective-addition and subtraction means.
Figure 2:
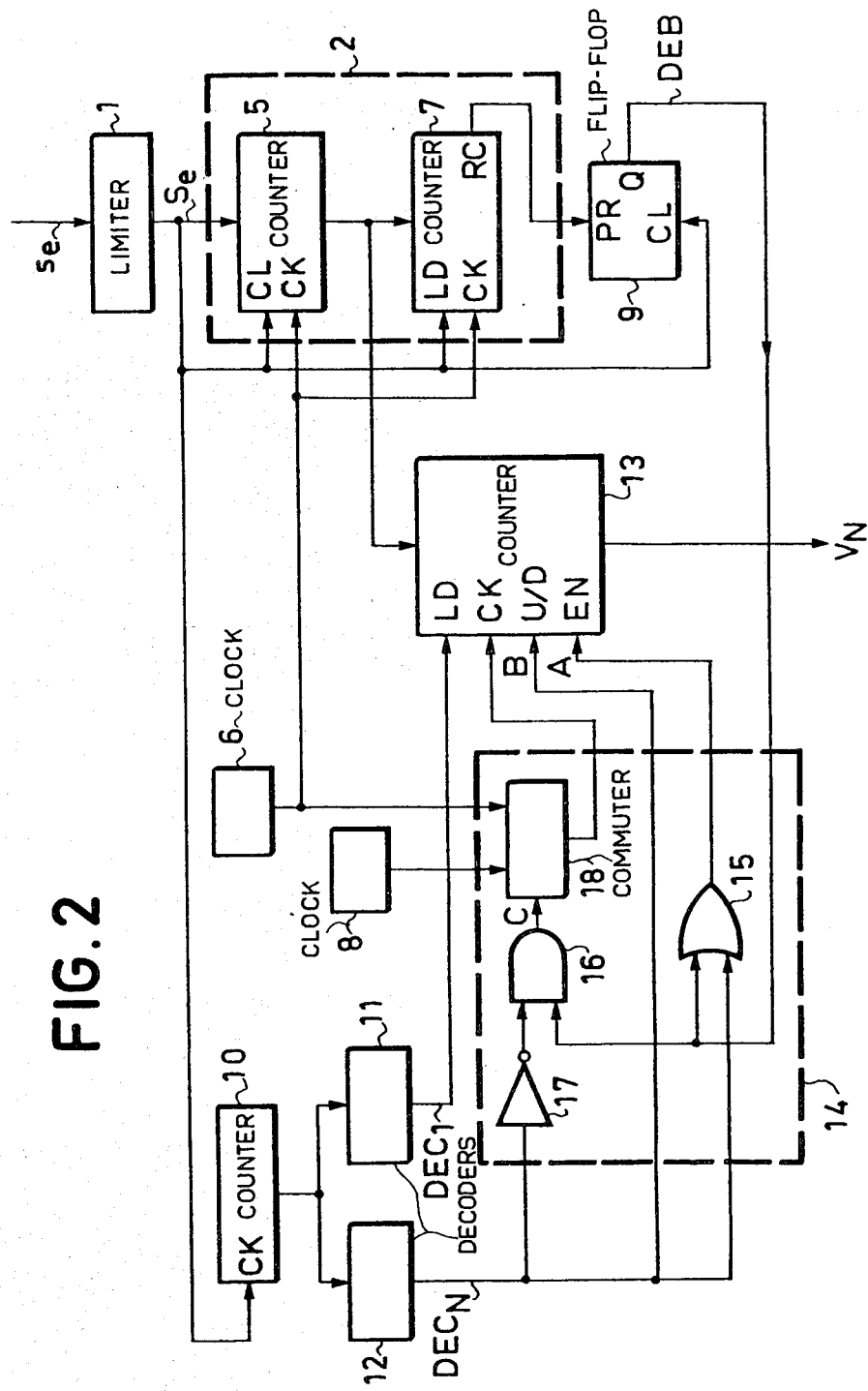
FIG. 2 is a diagram of a pseudo-variance computation device showing a second embodiment of the selective-addition and subtraction means.

Identical elements in FIGS. 1 and 2 are designated by identical references.

The structure of the pseudo-variance computation device shown in FIGS. 1 and 2 arises from the following principle which forms the basis of the invention.

It is sought to compute the quantity $$\sum_{i=1}^{N-1} |P_{i+1} - P_i|.$$

To this end, the following two quantities are defined:

$$V_i = \sum_{j=1}^{i-1} |P_{j+1} - P_j| \text{ and}$$

$Q_i = V_i + P_i$, with the following initial conditions:
$V_1 = 0$ and $Q_1 = P_1$.

The variable i is a whole number which is variable from 1 to N−1 and the variable j is a whole number which is variable from 1 to i−1.

We may accordingly write the following equalities:

$$V_{i+1} = V_i + |P_{i+1} - P_i| \text{ and}$$

$$Q_{i+1} = V_{i+1} + P_{i+1}.$$

In consequence, if $P_{i+1}$ is greater than $P_i$, we may write the following equality:

$$Q_{i+1} = Q_i + 2(P_{i+1} - P_i)$$

and if $P_{i+1}$ is smaller than $P_i$, we may write the following equality:

$Q_{i+1} = Q_i$.

The algorithm of computation of pseudo-variance in accordance with the invention therefore consists in causing the value of $Q_i$ of the quantity $2(P_{i+1} - P_i)$ to vary or not to vary up to the value of i equal to $N-1$, depending on the sign of the difference $P_{i+1} - P_i$. The first period $P_1$ provides the first value $Q_1$. The last period $P_N$ provides the last value $Q_N$; and in order to obtain the pseudo-variance $V_N$, it is only necessary to subtract the value $P_N$ from $Q_N$.

The pseudo-variance computation device shown in FIG. 1 comprises clipping means 1 for limiting the amplitude of the alternating-current signal $S_e$ received at the input of the device, detection means 2 connected to the output of the clipping means, selective-addition means 3 connected to the output of the detection means, and subtraction means 4 connected to the output of the selective-addition means and adapted to provide the pseudo-variance $V_N$ which it is sought to determine.

The detection means 2 comprise a first counter 5, the zero-reset input CL of which is connected to the output of the clipping means, the clock input CK of which is connected to the output of a first clock 6 for delivering a signal $H_1$ having a high frequency f, and the bidirectional counting selection input of which receives a signal (not shown) having a logic level which indicates that said counter must be incremented.

The detection means 2 further comprise a second counter 7, the loading inputs of which are connected to the outputs of the counter 5, the clock input CK of which is connected to the output of the clock 6, the loading control input LD of which is connected to the output of the clipping means, and the bidirectional counting selection input of which receives a signal (not shown) whose logic level indicates that said counter has to be decremented.

The selective-addition means comprise a third counter 3, the loading inputs of which are connected to the outputs of the counter 5, the loading control input LD of which is connected to the output of a circuit for locating a first instantaneous period, the clock input CK of which is connected to the output of a second clock 8 having a frequency equal to 2f, the bidirectional counting control input EN of which is connected to the output of a circuit 9 for storing the overflow of the second counter and the bidirectional counting selection input of which receives a signal (not shown) whose logic level indicates that said counter has to be incremented.

The subtraction means comprise a fourth counter 4, the loading inputs of which are connected to the outputs of the counter 3, the loading control input LD of which is connected to the output of a circuit for locating the Nth instantaneous period, the clock input CK of which is connected to the output of the clock 6, the bidirectional counting control input EN of which is connected to the output of the Nth instantaneous period decoder and the bidirectional counting selection input of which receives a signal (not shown) whose logic level indicates that said counter must be incremented.

The circuits for locating the first and Nth instantaneous periods comprise a fifth modulo N counter 10, the clock input CK of which is connected to the output of the rectifying and clipping means 1, a "value 1" decoder 11 and a "value N" decoder 12, the inputs of which are connected to the outputs of the counter 10.

The output of the decoder 11 is connected to the loading control input LD of the counter 3. The output of the decoder 12 is connected to the loading control input LD and to the bidirectional counting control input EN of the counter 4.

The overflow storage circuit 9 of the second counter consists of a bistable device whose input PR for forcing to the logic level "1" is connected to the retaining output RC of the counter 7 whose input CL for forcing to the logic level "0" is connected to the output of the rectifying and clipping means and whose output Q is connected to the input EN of the counter 3.

The operation of the pseudo-variance computation device shown in FIG. 1 will now be explained with reference to FIG. 3 which illustrates the waveforms obtained at different points of the device in respect of a particular value of N which is equal to 8.

The clipping means 1 converts the alternating-current signal $s_e$ to a rectangular signal $S_e$ which is adapted to be processed by means of logic circuits. The logic level "1" of the signal $S_e$ corresponds for example to positive amplitudes of the signal $s_e$, and the logic level "0" of the signal $S_e$ corresponds to negative amplitudes of the signal $s_e$.

By instantaneous period of the signal $s_e$ is meant the time interval which elapses between two consecutive zero-crossings of the signal $s_e$ or in other words the time interval which elapses between two wavefronts of the signal $s_e$, namely wavefronts having the same character and consisting of either leading or trailing edges. The zero-reset input CL of the counter 5 is sensitive to the leading edges of the signal $S_e$. Under these conditions, the counter 5 counts the number of periods of the clock signal $H_1$ between two successive leading edges of the signal $S_e$, this number being representative of the time-duration of the instantaneous periods $P_i$ of the signal $s_e$.

The loading control input LD of the counter 7 is sensitive to the leading edges of the signal $S_e$. Thus the counter 7 is loaded with the value $P_i$ at the beginning of the following instantaneous period $P_{i+1}$. Since the counter 7 is decremented at the same rate as the recurrence frequency of the clock signal $H_1$, said counter delivers at the end of the instantaneous period $P_{i+1}$ a number which is representative of the difference $P_{i+1} - P_i$.

The clock input CK of the counter 10 is sensitive to the leading edges of the signal $S_e$. Thus the decoder 11 delivers a signal $DEC_1$ having a high logic level when i assumes the value 1. Furthermore, the loading control input LD of the counter 3 is sensitive to the leading edges of the signal applied to said input. Under these conditions, the counter 3 is loaded with the value $P_1$ at the end of the first instantaneous period.

The circuit 9 for storing the overflow of the counter 7 delivers a signal DEB having a high logic level when the difference $P_{i+1} - P_i$ is positive. It is in fact assumed that the bistable device which constitutes said circuit is forced to the high logic level when the counter 7 overflows, then to the low logic level at the instant of appearance of the following leading edge of the signal $S_e$.

Thus, in the time interval during which the difference $P_{i+1} - P_i$ is positive or, more precisely, during which the difference $P_i - P_{i+1}$ employed in practice as shown in FIG. 3 is negative, the counter 3 is incremented at a rate which is double the rate of incrementation of the counter 7.

In consequence, at the end of the instantaneous period $P_{i+1}$, the counter 3 delivers at its outputs the value $$P_1 + 2 \sum_{j=1}^{i-1} |(P_{j+1} - P_j)|$$

with $P_{j+1} > P_j$ and $1 \leq j \leq i-1$.

The decoder 12 delivers a signal $DEC_N$ having a high logic level when i assumes the value N and when the loading control input LD and the bidirectional counting control input EN of the counter 4 are sensitive to the leading edges of the signal received by these inputs.

Thus, at the beginning of the Nth instantaneous period, the counter 4 is loaded with the value $$P_1 + 2 \sum_{i=1}^{N-1} |(P_{i+1} - P_i)|$$

with $P_{i+1} > P_i$ and, at the end of the Nth instantaneous period, the counter delivers at its outputs the quantity $$P_1 + 2 \sum_{i=1}^{N-1} (P_{i+1} - P_i) - P_N,$$

where $P_{i+1} - P_i$ is positive, namely the pseudo-variance which it is sought to determine.

The pseudo-variance computation device shown in FIG. 2 differs from the device shown in FIG. 1 solely in the construction of the selective-addition means and of the subtraction means. In FIG. 2, the selective-addition means and the subtraction means are formed by means of a single counter 13 associated with a control logic unit 14.

The loading inputs of the counter 13 are connected to the outputs of the counter 5.

The control logic unit 14 comprises a clock selection circuit, a bidirectional counting selection circuit, and a bidirectional counting control circuit.

The bidirectional counting control circuit has an OR-gate 15 provided with one input connected to the output of the decoder 12, one input connected to the output of the bistable device 9 and one output connected to the bidirectional counting control input EN of the counter 13.

The clock selection circuit has an AND-gate 16 provided with one input connected to the output of the bistable device 9 and one input connected to the output of the decoder 12 via an inverter 17.

The clock selection circuit further comprises a switch 18 provided with one input connected to the output of the first clock 6, one input connected to the output of the second clock 8, and one control input connected to the output of the AND-gate 16 and one output connected to the clock input CK of the counter 13.

The bidirectional counting selection circuit is constituted by a single lead connected between the output of the decoder 12 and the bidirectional counting selection input U/D of the counter 13.

The loading control input LD of the counter 13 is connected to the output of the decoder 11.

The operation of the computing device shown in FIG. 2 will now be explained with reference to the following truth table which gives the logic level of the signals A, B and C which supply respectively the bidirectional counting control input, the bidirectional selection input of the counter 13, and the control input of the switch 18 as a function of the logic level of the signals $DEC_N$ and DEB obtained respectively at the output of circuits 9 and 12.

| $DEC_N$ | DEB | A | B | C |
|---|---|---|---|---|
| 0 | 0 | 0 | X | X |
| 0 | 1 | 1 | 0 | 0 |
| 1 | 0 | 1 | 1 | 1 |
| 1 | 1 | 1 | 1 | 0 |

When the signals $DEC_N$ and DEB have the logic level "0", this means that the variable i has a value which is different from $N-1$ but the condition $P_{i+1} > P_i$ is not satisfied. In consequence, the counter 13 must not be operated either for forward counting or for backward counting. This is indicated by a logic level "0" of the signal A and by an indifferent logic level (symbol x) of the signals B and C.

When the signal $DEC_N$ has the logic level "0" and the signal DEB has the logic level "1", this means that the variable i has a value which is different from $N-1$ but that the conditions $P_{i+1} > P_i$ is satisfied. In consequence, the counter 13 must be operated for counting at the same rate as the recurrence frequency of the clock signal $H_2$. This is indicated by a logic level "1" of the signal A and by a logic level "0" of the signals B and C.

When the signal $DEC_N$ has the logic level "1" and the signal DEB has the logic level "0", this means that the variable i has a value equal to $N-1$ and that the condition $P_{i+1} > P_i$ is not satisfied. In consequence, the counter 13 must be operated for backward counting at the same rate as the recurrence frequency of the clock signal $H_1$. This is indicated by a logic level "1" of the signals A, B and C.

When the signals $DEC_N$ and DEB have the logic level "1", this means that the variable i has the value $N-1$ and that the condition $P_{i+1} > P_i$ is established. In consequence, the counter 13 must be operated simultaneously both for backward counting at the same rate as the clock signal $H_1$ having a frequency f and for forward counting at the same rate as the clock signal $H_2$ having a frequency 2f. This is equivalent to operating the counter 13 for counting at the rate of the clock signal $H_1$ having a frequency f. And this is indicated by a logic level "1" of the signals A and B and by a logic level "0" of the signal C.

It is therefore apparent from the foregoing description that the device in accordance with the invention for computing pseudo-variance has an extremely simple structure and calls for the use of a very small number of components.

What is claimed is:

1. A device for computation of the pseudo-variance $$\sum_{i=1}^{N-1} |(P_{i+1} - P_i)|$$

of the N instantaneous periods $P_i$ ($1 \leq i \leq N-1$) of an alternating-current signal mixed with noise, the device being provided with clipping means for limiting the amplitude of the alternating-current signal, wherein said device comprises detection means which serve to detect the sign of the difference $P_{i+1} - P_i$ ($1 \leq i \leq N-1$) and are connected to the output of said clipping means, selective-addition means which serve to add the quantity $2(P_{i+1} - P_i)$ to the quantity $$P_1 + 2 \sum_{j=1}^{i-1} (P_{j+1} - P_j)$$

with $1 \leq j \leq i$ and $P_{j+1} > P_j$) when $P_{i+1}$ is greater than $P_i$ and which are connected to the output of said detection means, and subtraction means which serve to subtract the value $P_N$ from the value $$P_1 + 2 \sum_{i=1}^{N-1} (P_{i+1} - P_i)$$

(with $1 \leq i \leq N-1$ and $P_{i+1} > P_i$) and which are connected to the output of said selective-addition means, the pseudo-variance to be determined being provided by said subtraction means.

2. A device according to claim 1, wherein the detection means comprise a first counter for measuring the time-duration of each instantaneous period $P_i$, said first counter being incremented at the recurrence rate of a first clock signal having a frequency f and reinitialized by the signal delivered by the clipping means aforesaid, and a second counter decremented at the recurrence rate of the first clock signal and loaded by the output signal of the first counter at the end of each instantaneous period.

3. A device according to claim 1, wherein the selective-addition means comprise a third counter loaded by the output signal of the first counter, said third counter being incremented at the recurrence rate of a second clock signal having a frequency 2f and said third counter being controlled by the signal delivered by the detection means.

4. A device according to claim 1, wherein the subtraction means comprise a fourth counter loaded by the output signal of the third counter, said fourth counter being decremented at the recurrence rate of the first clock signal and being controlled by the output signal of a circuit which serves to locate the Nth instantaneous period and receives the signal delivered by the clipping means, the pseudo-variance to be determined being delivered by the output of the fourth counter.

5. A device according to claim 4, wherein the circuit for locating the Nth instantaneous period comprises a fifth modulo N counter incremented at the recurrence rate of the signal delivered by the clipping means, and a decoder for the value N connected to the output of the fifth counter, the output of the locating circuit being constituted by the output of the decoder for the value N.

6. A device according to claim 1, wherein the selective-addition and subtraction means comprise a sixth counter being loaded, at the first instantaneous period of the alternating current signal, by the signal delivered by the first counter and a sixth-counter control logic unit which receives a first clock signal having a frequency f, a second clock signal having a frequency 2f, the signal delivered by a circuit for locating the Nth instantaneous period, and the signal delivered by the detection means, and which delivers the bidirectional counting control signal, the bidirectional counting selection signal and the clock signal of the sixth counter, the pseudo-variance to be determined being delivered by the output of said sixth counter.

7. A device according to claim 6, wherein the control logic unit of the sixth counter comprises a bidirectional counting control circuit, a bidirectional counting selection circuit, and a clock selection circuit of the sixth counter.

8. A device according to claim 7, wherein the clock selection circuit of the sixth counter comprises an AND-gate which receives the signal delivered by the circuit for locating the Nth instantaneous period and reversed by means of an inverter as well as the signal delivered by the detection means, said AND-gate being also adapted to deliver the control signal to the switch which receives two clock signals having a frequency f and 2f, the clock signal being delivered by said switch to said sixth counter.

9. A device according to claim 7, wherein the bidirectional counting control circuit of the sixth counter comprises an OR-gate which receives the signals delivered respectively by the detection means and by the circuit for locating the Nth instantaneous period and which delivers the bidirectional counting control signal of said sixth counter.

10. A device according to claim 8, wherein the bidirectional counting selection circuit is constituted by a lead wire connected between the output of the circuit for locating the Nth instantaneous period and the bidirectional counting selection input of the sixth counter.

* * * * *